US009959289B2

(12) United States Patent
Kishore (10) Patent No.: US 9,959,289 B2
(45) Date of Patent: May 1, 2018

(54) NAVIGATION SYSTEM WITH CONTENT DELIVERY MECHANISM AND METHOD OF OPERATION THEREOF (71) Applicant: Telenav, Inc., Sunnyvale, CA (US)

(72) Inventor: Sumit Kishore, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 71 days.

(21) Appl. No.: 14/472,823

(22) Filed: Aug. 29, 2014

(65) Prior Publication Data

US 2016/0063032 A1    Mar. 3, 2016

(51) Int. Cl.
G01C 21/00 (2006.01)
G06F 17/30 (2006.01)
G01C 21/36 (2006.01)

(52) U.S. Cl.
CPC ... G06F 17/30241 (2013.01); G01C 21/3602 (2013.01); G01C 21/3679 (2013.01)

(58) Field of Classification Search
None
See application file for complete search history.

(56) References Cited

U.S. PATENT DOCUMENTS

| | | | | |
|---|---|---|---|---|
| 8,781,733 B2* | 7/2014 | Staehlin | ............... | G01C 21/28 701/450 |
| 8,949,016 B1* | 2/2015 | Ferguson | ................. | B60Q 1/00 340/436 |
| 9,098,929 B1* | 8/2015 | Wakim | ............... | G01C 21/3682 |
| 9,123,152 B1* | 9/2015 | Chatham | ............... | G06T 17/005 |
| 9,397,890 B2* | 7/2016 | Petersen | ............. | H04L 41/0893 |
| 2003/0125235 A1* | 7/2003 | Foxwell | ................. | C07K 16/40 424/139.1 |
| 2006/0271286 A1 | 11/2006 | Rosenberg | | |
| 2007/0208505 A1* | 9/2007 | Fujimoto | ............. | G09B 29/106 701/451 |
| 2008/0183376 A1* | 7/2008 | Knockeart | ......... | G01C 21/3415 701/119 |
| 2009/0070035 A1* | 3/2009 | Van Buer | ............... | G01C 21/32 701/450 |
| 2009/0177378 A1* | 7/2009 | Kamalski | ............... | G01C 21/26 701/408 |
| 2009/0228204 A1* | 9/2009 | Zavoli | .................... | G01C 21/30 701/532 |
| 2009/0276153 A1 | 11/2009 | Lee | | |
| 2010/0042651 A1* | 2/2010 | Nakamura | ............. | G01C 21/32 701/450 |
| 2010/0131189 A1* | 5/2010 | Geelen | .................. | G01C 21/32 701/533 |
| 2012/0033032 A1 | 2/2012 | Kankainen | | |

(Continued)

FOREIGN PATENT DOCUMENTS

WO    WO 2011054546 A1 *  5/2011    ............. G01C 21/36

Primary Examiner — Thomas G Black
Assistant Examiner — Demetra R Smith-Stewart
(74) Attorney, Agent, or Firm — Perspectives Law Group (57) ABSTRACT A method of operation of a navigation system includes: determining a navigation component based on comparing a traversal content to a stored content for identifying an object type; determining a content discrepancy based on the navigation component present in the traversal content but unidentified in the stored content; and generating a content filler with a control unit based on the content discrepancy for presenting on a device the navigation component missing in map information.

20 Claims, 6 Drawing Sheets (56) References Cited

U.S. PATENT DOCUMENTS

| | | | |
|---|---|---|---|
| 2012/0065811 A1* | 3/2012 | Nakamura | G01C 21/30 |
| | | | 701/1 |
| 2012/0254707 A1* | 10/2012 | Cooke | G01C 21/32 |
| | | | 714/799 |
| 2013/0076766 A1* | 3/2013 | Yamagishi | G01C 21/32 |
| | | | 345/522 |
| 2013/0101159 A1* | 4/2013 | Chao | G06K 9/00771 |
| | | | 382/103 |
| 2014/0115507 A1 | 4/2014 | Bailey et al. | |
| 2014/0278055 A1* | 9/2014 | Wang | G01C 21/32 |
| | | | 701/409 |
| 2015/0356868 A1* | 12/2015 | Cuende Alonso | G01C 21/36 |
| | | | 382/104 |

* cited by examiner

NAVIGATION SYSTEM WITH CONTENT DELIVERY MECHANISM AND METHOD OF OPERATION THEREOF

TECHNICAL FIELD

The present invention relates generally to a navigation system, and more particularly to a system with content delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without content delivery mechanism to efficiently deliver content to user has become a paramount concern for the consumer. The inability decreases the benefit of using the tool.

Thus, a need still remains for a navigation system with content delivery mechanism to deliver content efficiently to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a navigation component based on comparing a traversal content to a stored content for identifying an object type; determining a content discrepancy based on the navigation component present in the traversal content but unidentified in the stored content; and generating a content filler with a control unit based on the content discrepancy for presenting on a device the navigation component missing in map information.

The present invention provides a navigation system, including: a control unit for: determining a navigation component based on comparing a traversal content to a stored content for identifying an object type, determining a content discrepancy based on the navigation component present in the traversal content but unidentified in the stored content, generating a content filler based on the content discrepancy, and a communication interface, coupled to the control unit, for communicating the content filler for presenting on a device the navigation component missing in map information.

The present invention provides a navigation system having a non-transitory computer readable medium including instructions for execution, the instructions comprising: determining a navigation component based on comparing a traversal content to a stored content for identifying an object type; determining a content discrepancy based on the navigation component present in the traversal content but unidentified in the stored content; and generating a content filler based on the content discrepancy for presenting on a device the navigation component missing in map information.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, the navigation information is presented in the format of (X, Y), where X and Y are two ordinates that define the geographic location, i.e., a position of a user.

In an alternative embodiment, the navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
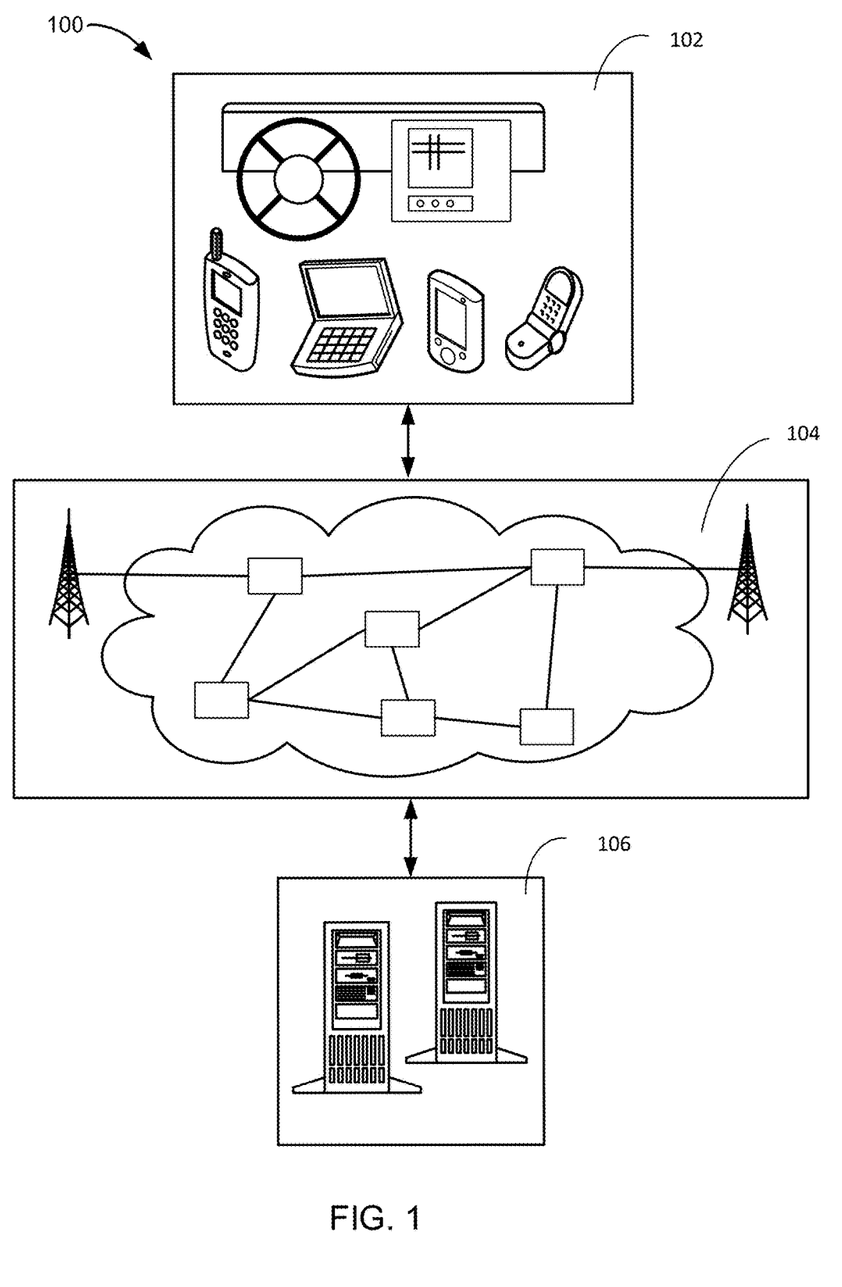
FIG. 1 is a navigation system with content delivery mechanism in an embodiment of the present invention.

Referring now to FIG. 1, therein is shown a navigation system 100 with content delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
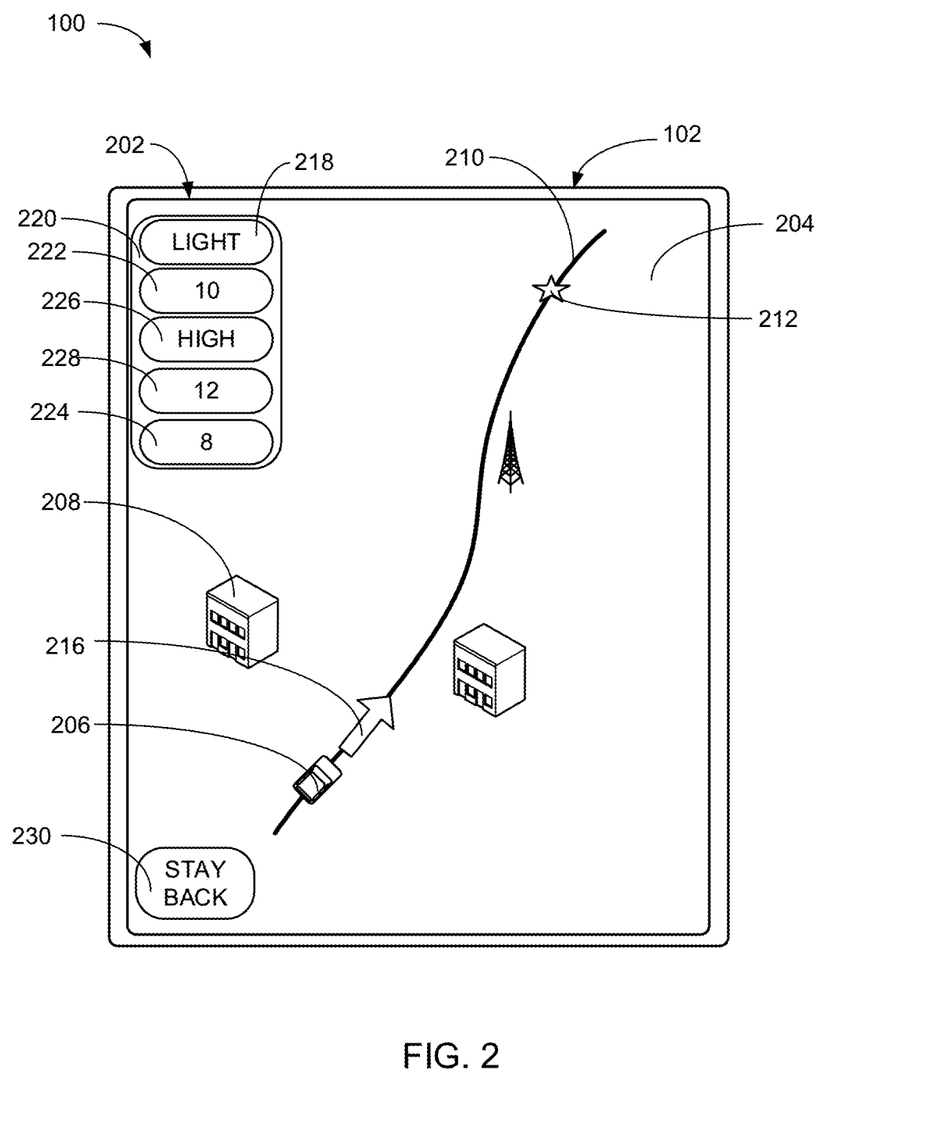
FIG. 2 is an example of a traversal environment.

Referring now to FIG. 2, there is shown an example of a traversal environment 202. For clarity and brevity, the discussion of the embodiment of the present invention will focus on the first device 102 delivering the result generated by the navigation system 100. However, various embodiments of the present invention can easily be applied with the description with the second device 106 of FIG. 1 and the first device 102 interchangeably.

The traversal environment 202 is defined as a situation or circumstance surrounding the user's travel. For example, the traversal environment 202 can include a geographic area 204 traveled by the user of the navigation system 100 with first device 102. The geographic area 204 can include a current location 206, a geographic location 208, or a combination thereof. The geographic location 208 is a physical location within the geographic area 204. The current location 206 is defined as the geographic location 208 where the first device 102 is detected.

The navigation system 100 can display a travel route 210 from the current location 206 to a destination 212 on the first device 102. The travel route 210 can represent a path that the user can reach the destination 212. The destination 212 can represent a waypoint, an end point, or a combination thereof of the user's travel. The travel route 210 can include a point of interest 214, which can represent the geographic location 208 where the user has interest in reaching. For example, the point of interest 214 representing a grocery store can be the destination 212 at the end of the user's travel.

A travel direction 216 is a course where the first device 102 is heading towards. For example, the travel direction 216 can represent the user's vehicle with the first device 102 heading towards a cardinal direction of north. A traffic condition 218 is defined as a state of traffic in the geographic area 204. For example, the traffic condition 218 can include no traffic, light traffic, heavy traffic, accident, or a combination thereof.

The navigation system 100 can present travel information 220 with the first device 102. The travel information 220 is defined as facts to aid the user's travel. The travel information 220 can represent the navigation information discussed above. For example, the travel information 220 can include the traffic condition 218 of the travel route 210. For further example, the first device 102 can display the travel information 220 visually, play the travel information 220 in audio form, or a combination thereof.

The navigation system 100 can determine the traffic condition 218 based on comparing a vehicle count 222 to a count threshold 224. The vehicle count 222 is defined as a number of vehicles surrounding the user's vehicle. The count threshold 224 is a number of objects detected by the navigation system 100. For example, the count threshold 224 can represent a minimum number of vehicles required for the navigation system 100 to determine that the traffic condition 218 represents a heavy traffic.

The navigation system 100 can determine a popularity level 226 of the point of interest 214 by comparing a people count 228 to the count threshold 224. The popularity level 226 is defined as a level of predilection to the point of interest 214. For example, the popularity level 226 can represent high popularity if the people count 228 meets or exceeds the count threshold 224. The people count 228 is defined as a number of people detected at the point of interest 214. For example, the people count 228 can represent a number of people in line to enter the point of interest 214.

The navigation system 100 can display a user safety 230 as part of the travel information 220. For example, the user safety 230 can represent how close in distance the user's vehicle can be to another vehicle in front of the user's vehicle.

Figure 3:
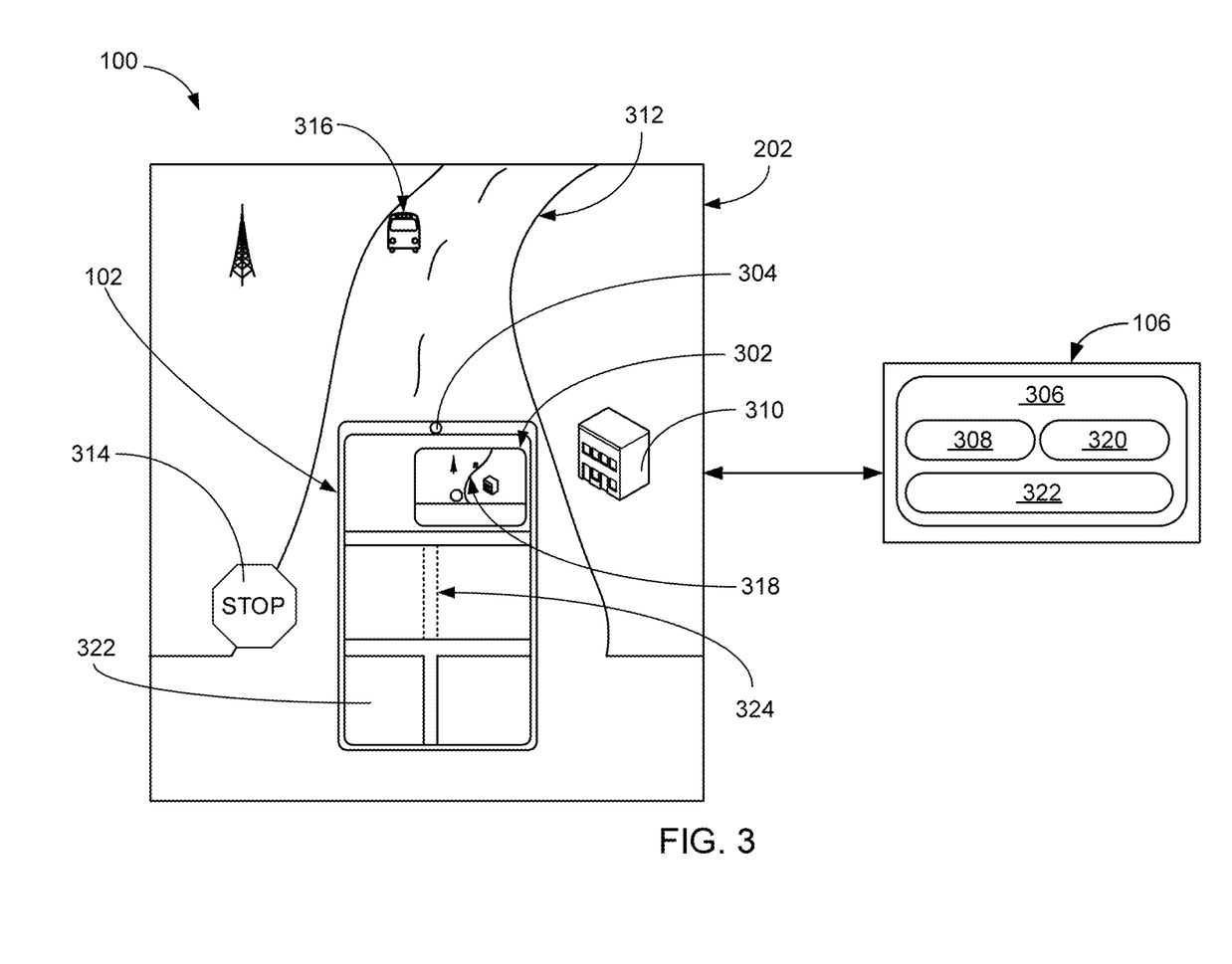
FIG. 3 is an example of a traversal content captured in the traversal environment.

Referring now to FIG. 3, there is shown an example of a traversal content 302 captured in the traversal environment 202. The traversal content 302 is defined as information captured by a capturing sensor 304. For example, the traversal content 302 can include a digital image, a video, an audio information, or a combination thereof. The capturing sensor 304 can represent a digital camera, a video camera, an audio recorder, or a combination thereof installed on the first device 102. For further example, the capturing sensor 304 can be installed on the user's vehicle. A plurality of the capturing sensor 304 can be installed on the front, the back, the sides, the top, the bottom, or a combination thereof of the user's vehicle.

The navigation system 100 can compare the traversal content 302 to a stored content 306, an object image 308, or a combination thereof. The stored content 306 can represent a digital image, a video recording, an audio recording, or a combination thereof that has been stored by the navigation system 100. For example, the stored content 306 can be stored by the second device 106. The stored content 306 can include the object image 308, which is defined as the digital image specific to an object type 310. For example, the object image 308 can represent a road type 312, a traffic controller type 314, or a vehicle type 316.

The object type 310 is defined as a classification of an object captured by the capturing sensor 304. The road type 312 is defined as a classification of a road. For example, the road type 312 can include a paved road or unpaved road. The road type 312 can include a highway or non-highway, such as local road, arterial road, or a combination thereof.

The traffic controller type 314 is defined as a classification of a traffic controller. For example, the traffic controller type 314 can include a stop light, a stop sign, a lane line, or a combination thereof. The vehicle type 316 is defined as a classification of a vehicle. For example, the vehicle type 316 can represent an automobile, a truck, an electric car, or a combination thereof.

A navigation component 318 is defined as an object identified within the traversal content 302. For example, the navigation component 318 can represent the object type 310. A content discrepancy 320 is defined as a difference between the traversal content 302 and the stored content 306. For example, the content discrepancy 320 can indicate that the traversal content 302 can include the road type 312 of a paved road while the stored content 306 can include the road type 312 of an unpaved road for the same instance of the geographic location 208 of FIG. 2.

A map information 322 can represent the navigation information of the geographic area 204 of FIG. 2. For example, the stored content 306 can include the map information 322. For further example, the map information 322 can represent the navigation information prior to the capturing sensor 304 capturing the traversal content 302. As a result, the content discrepancy 320 can exist between the traversal content 302 and the map information 322.

A content filler 324 is defined as the information to fill the gap that exists due to the content discrepancy 320. For example, the navigation system 100 can replace the map information 322 representing the road type 312 of the unpaved road with the navigation component 318 representing the paved road to update the map information 322.

Figure 4:
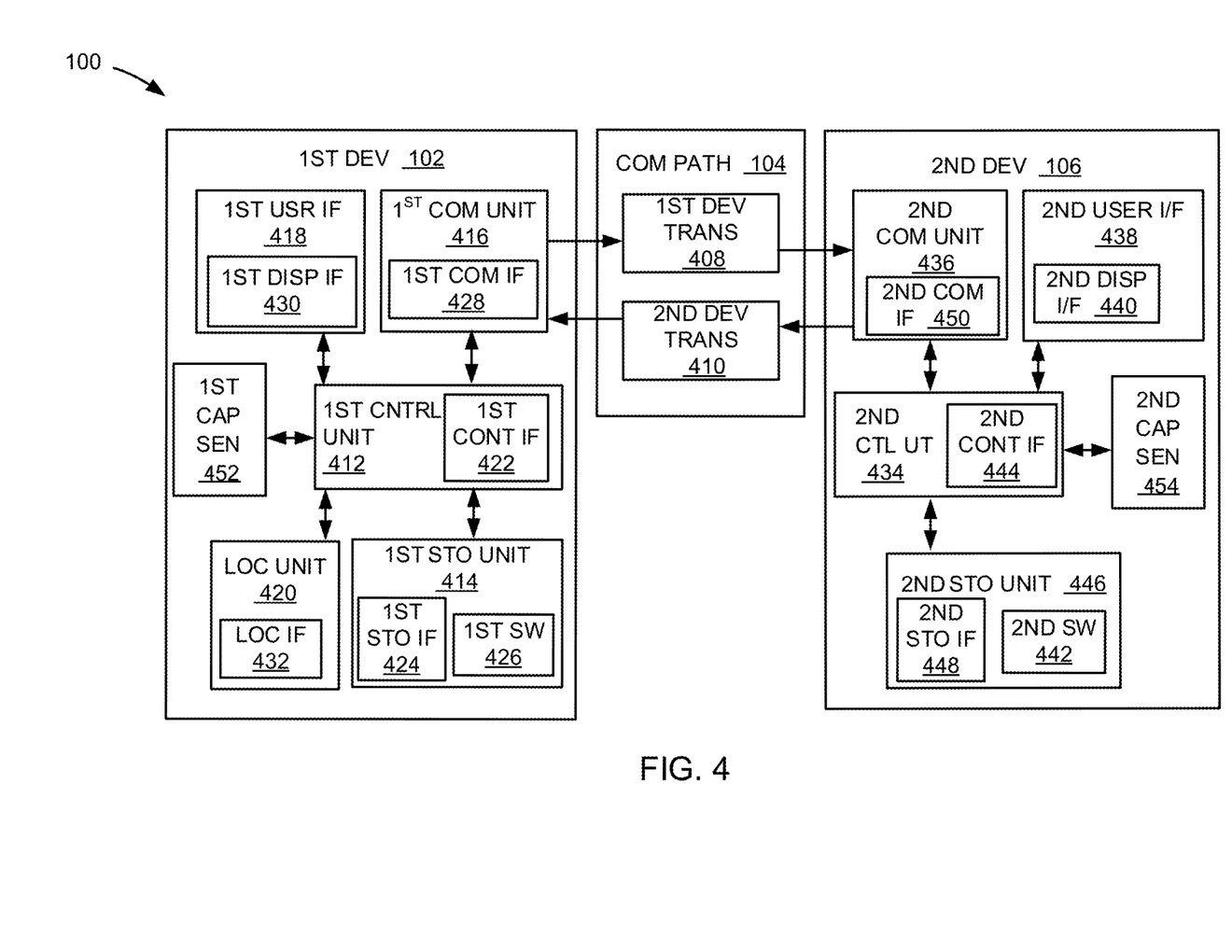
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first capturing sensor 452 can be the capturing sensor 304 of FIG. 2. The first capturing sensor 452 can capture the traversal environment 202 of FIG. 2. The first capturing sensor 452 can capture the object type 310 of FIG. 2 from the outside, the inside, or the combination thereof of the user's vehicle.

Examples of the first capturing sensor 452 can include a digital camera, video camera, thermal camera, night vision camera, infrared camera, x-ray camera, or the combination thereof. Examples of the first capturing sensor 452 can include accelerometer, thermometer, microphone, wireless signal receiver, remote physiological monitoring device, light identifier, or the combination thereof.

A second capturing sensor 454 can be the capturing sensor 304. The second capturing sensor 454 can capture the traversal environment 202. The second capturing sensor 454 can capture the object type 310 from the outside, the inside, or the combination thereof of the user's vehicle.

Examples of the second capturing sensor 454 can include a digital camera, video camera, thermal camera, night vision camera, infrared camera, x-ray camera, or the combination thereof. Examples of the second capturing sensor 454 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
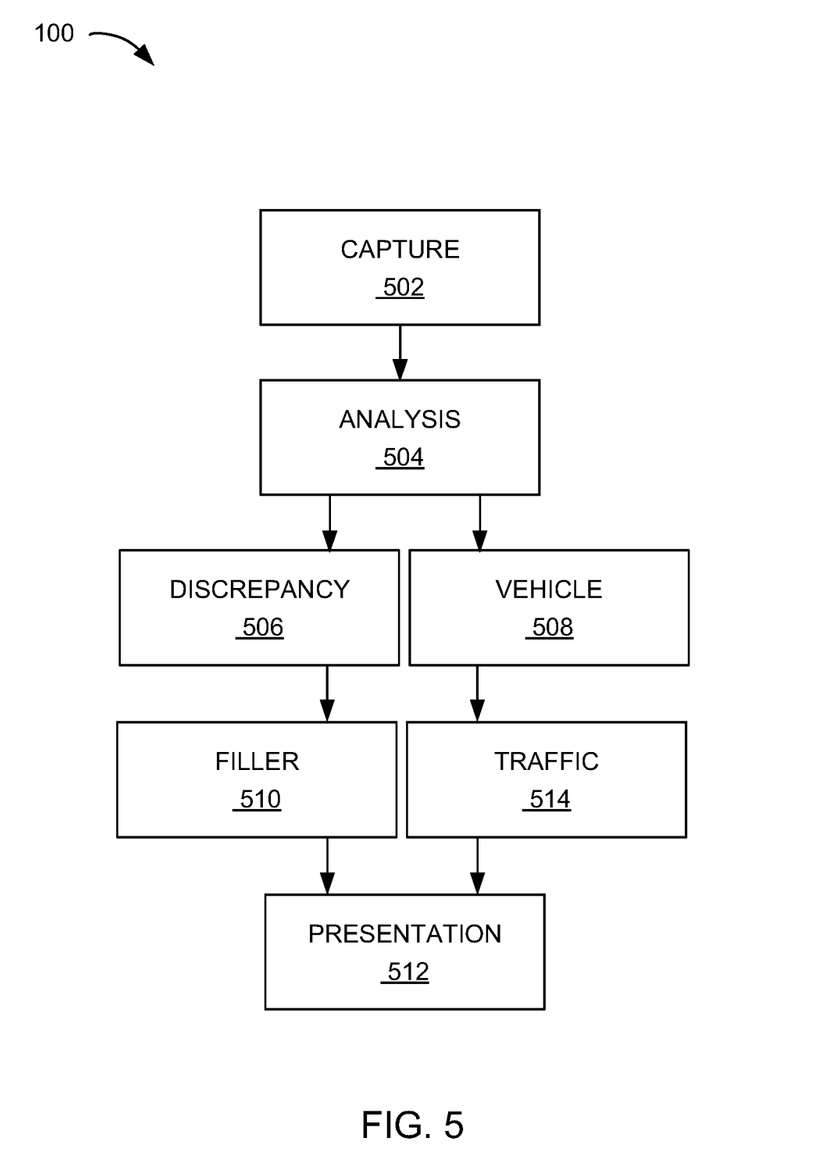
FIG. 5 is a control flow of the navigation system.

Referring now to FIG. 5, therein is shown a control flow of the navigation system 100. The navigation system 100 can include a capture module 502. The capture module 502 captures the traversal content 302 of FIG. 3. For example, the capture module 502 can capture the traversal content 302 with the capturing sensor 304 of FIG. 3.

The capture module 502 can capture the traversal content 302 in a number of ways. For example, the capture module 502 can capture the traversal content 302 with the capturing sensor 304 representing the digital camera. More specifically, the capture module 502 can capture the traversal content 302 of the traversal environment 202 of FIG. 2 surrounding the first device 102.

For a specific example, the capture module 502 can capture the traversal content 302 of the traversal environment 202 for each cardinal direction relative to the first device 102. For further example, the capture module 502 can capture the traversal content 302 for each cardinal direction for x, y, and z coordinates having the first device 102 at the center of the coordinates.

For another example, the capture module 502 can track the current location 206 of FIG. 2, the geographic area 204 of FIG. 2, or a combination thereof where the traversal content 302 was captured via the location unit 420 of FIG. 4. More specifically, the capture module 502 can synchronously, asynchronously, or a combination thereof aggregate a plurality of the traversal content 302 captured by storing in the first storage unit 414 of FIG. 4, the second storage unit 446 of FIG. 4, or a combination thereof.

For a specific example, the capture module 502 can store the information related to the traversal environment 202 surrounding the first device 102 of when the traversal content 302 was captured. For example, the information can include the object type 310 of FIG. 3 including the road type 312 of FIG. 3, the traffic controller type 314 of FIG. 3, or a combination thereof. The information can be captured along with the traversal content 302 for further analysis by the navigation system 100. The capture module 502 can communicate the traversal content 302 to an analysis module 504.

The navigation system 100 can include the analysis module 504, which can couple to the capture module 502. The analysis module 504 determines the navigation component 318 of FIG. 3. For example, the analysis module 504 can determine the navigation component 318 of the traversal content 302.

The analysis module 504 can determine the navigation component 318 in a number of ways. For example, the analysis module 504 can determine the navigation component 318 within the traversal environment 202 captured on the traversal content 302 based on performing the image recognition algorithm.

More specifically, the analysis module 504 can perform the image recognition algorithm by comparing the color, the texture cue, the shape, the contour, anchoring points, or the combination thereof of the traversal content 302 captured by the capturing sensor 304. Furthermore, the analysis module 504 can compare the traversal content 302 to the stored content 306 of FIG. 3 captured at the same instance of the geographic location 208 of FIG. 2, the geographic area 204, or a combination thereof.

For a specific example, the analysis module 504 can determine the navigation component 318 by identifying the object type 310 including the road type 312, the traffic controller type 314, the vehicle type 316 of FIG. 3, or a combination thereof. The stored content 306 can include the object type 310 identified for the analysis module 504 to compare with the traversal content 302.

For example, the analysis module 504 can compare the traversal content 302 captured at the current location 206 to the stored content 306 captured at the geographic location 208 representing the current location 206. The stored content 306 can include the object type 310 including the road type 312 of a paved road, the traffic controller type 314 representing the lane line, or a combination thereof. The analysis module 504 can determine the navigation component 318 based on performing the image recognition algorithm to compare the color, the texture cue, the shape, the contour, anchoring points, or the combination thereof of the traversal content 302 to the stored content 306.

Moreover, the color, the texture cue, the shape, the contour, anchoring points, or the combination thereof can represent a pattern for the analysis module 504 to determine the similarity between the traversal content 302 and the stored content 306. The analysis module 504 can determine the similarity between the traversal content 302 and the stored content 306 based on a match between the pattern within the traversal content 302 and the stored content 306.

For further example, the analysis module 504 can perform the optical character recognition (OCR) on the traversal content 302 to identify the traffic controller type 314 of the stop sign by identifying the word on the signage. For another example, the analysis module 504 can compare the traversal content 302 to the object image 308 of FIG. 3 to identify the navigation component 318 within the traversal content 302. More specifically, the object image 308 can represent a specific brand of an automobile. The analysis module 504 can compare the object type 310 within the traversal content 302 to the object image 308 to identify the specific instance of the vehicle type 316.

For further example, the analysis module 504 can determine the navigation component 318 based on the object image 308 to identify the navigation component 318 present in the traversal content 302 but not present in the stored content 306. More specifically, the traversal content 302 can include the navigation component 318 representing the traffic controller type 314 of a traffic light.

The analysis module 504 can determine that the navigation component 318 represents a traffic light based on comparing the traversal content 302 to the object image 308 representing a traffic light. The analysis module 504 can perform the image recognition algorithm to determine that the object image 308 within the traversal content 302 is indeed a traffic light based on comparing to the object image 308 stored on the first storage unit 414, the second storage unit 446, or a combination thereof. The analysis module 504 can determine the navigation component 318 similarly for other instances of the traffic controller type 314 such as speed traps, red light cameras, or a combination thereof.

For further example, the analysis module 504 can determine the navigation component 318 between the road type 312 of the paved road and the unpaved road. More specifically, the analysis module 504 can determine the navigation component 318 within the traversal content 302 to represent the paved road or the unpaved road based on matching the traversal content 302 to the stored content 306, the object image 308, or a combination thereof with the image recognition algorithm.

The analysis module 504 can determine the navigation component 318 between the road type 312 of the highway and the non-highway, such as a local street. More specifically, the analysis module 504 can determine the navigation component 318 within the traversal content 302 to represent the highway or the local street based on matching the traversal content 302 to the stored content 306, the object image 308, or a combination thereof with the image recognition algorithm. Furthermore, the analysis module 504 can confirm the navigation component 318 to be the highway or not based on validating the determination of the navigation component 318 with the GPS information obtained via the location unit 420.

For a different example, the analysis module 504 can validate the map information 322 based on the traversal content 302 captured. More specifically, the map information 322 can provide the point of interest 214 of FIG. 2. The analysis module 504 can determine the navigation component 318 as the point of interest 214 based on the image recognition algorithm discussed above. Further, the analysis module 504 can determine the name of the point of interest 214 based on performing the OCR on the traversal content 302. The analysis module 504 can determine whether the point of interest 214 is open or closed for business based on the performing the OCR on the signage indicating open or closed. The analysis module 504 can determine other instances of the navigation component 318 in the traversal content 302 based on performing the image recognition algorithm to identify the existence of the services, such as drive thru, automatic teller machine, or a combination thereof, at the point of interest 214. The analysis module 504 can validate the map information 322 based on matching the point of interest 214 on the map information 322 to the point of interest 214 identified on the traversal content 302.

It has been discovered that the navigation system 100 validating the map information 322 can improve the accuracy of the travel information 220 of FIG. 2 presented on the first device 102. By validating the map information 322 with the traversal content 302 captured, the navigation system 100 can obtain the most current navigation information. As a result, the navigation system 100 can present an accurate instance of the travel information 220 for a safer operation of the navigation system 100, the first device 102, or a combination thereof.

For further example, the analysis module 504 can determine the popularity level 226 of FIG. 2 at the point of interest 214 based on the traversal content 302. More specifically, the point of interest 214 can represent a ramen noodle shop. The analysis module 504 can determine the popularity level 226 based on performing the image recognition algorithm to identify the number of people waiting in front of the point of interest 214. More specifically, the analysis module 504 can determine the popularity level 226 of high popularity if the people count 228 of FIG. 2 meets or exceeds the count threshold 224 of FIG. 2. If the people count 228 is below the count threshold 224, the analysis module 504 can determine the popularity level 226 of the point of interest 214 to be of low popularity.

It has been discovered that the navigation system 100 determining the popularity level 226 of the point of interest 214 can improve the accuracy of the travel information 220 presented on the first device 102. Rather than basing the popularity level 226 based on the user review, the navigation system 100 can accurately determine the popularity level 226 based on the traversal content 302 captured. As a result, the navigation system 100 can improve the accuracy of the popularity level 226 and reduce the number of false positives created by fake reviews.

For another example, the analysis module 504 can determine the user safety 230 of FIG. 2 based on the traversal content 302 captured from the capturing sensor 304 placed on the front of the user's vehicle. More specifically, the traversal content 302 can include the object type 310 representing the vehicle. The analysis module 504 can determine the distance between the user's vehicle and the vehicle in front based on the traversal content 302 captured.

For another example, the analysis module 504 can determine the current location 206 based on the traversal content 302 captured. A plurality of the capturing sensor 304 can capture the traversal environment 202 surrounding the user's vehicle or the first device 102. More specifically, the capturing sensor 304 can capture the traffic controller type 314 of the lane line indicating the path that the user's vehicle needs to travel on the road type 312. More specifically, the analysis module 504 can determine the current location 206 based on the distance between the user's vehicle and the lane line. As a result, the analysis module 504 can determine the current location 206 to represent whether the user's vehicle is in the middle of the lane or the edge of the lane. The analysis module 504 can communicate the traversal content 302 with the navigation component 318 identified to a discrepancy module 506, a vehicle module 508, or a combination thereof.

The navigation system 100 can include the discrepancy module 506, which can couple to the analysis module 504. The discrepancy module 506 determines the content discrepancy 320 of FIG. 3. For example, the discrepancy module 506 can determine the content discrepancy 320 based on the traversal content 302, the stored content 306, the object image 308, or a combination thereof.

The discrepancy module 506 can determine the content discrepancy 320 in a number of ways. For example, the discrepancy module 506 can determine the content discrepancy 320 based on the difference between the traversal content 302 and the stored content 306. More specifically, the stored content 306 can represent the traversal environment 202 of the current location 206 for a period of time prior to the user's current travel. The traversal content 302 currently captured can include the object image 308 but not present in the stored content 306 as discussed above.

Continuing with the previous example, the object image 308 present in the traversal content 302 can represent the road type 312 of a paved road. However, the paved road can be not present in the stored content 306 as discussed above. The discrepancy module 506 can determine the content discrepancy 320 by identifying in the object type 310 present in the traversal content 302 but not present in the stored content 306.

More specifically, the discrepancy module 506 can determine the content discrepancy 320 by confirming with the map information 322 of FIG. 3 of the geographic area 204, the geographic location 208, or a combination thereof. The stored content 306 can have the road currently traveled as disjointed due to various reasons including data inaccuracies, road construction, or a combination thereof. The map information 322 can represent the navigation information when the stored content 306 was recorded in the past. The discrepancy module 506 can determine the content discrepancy 320 by identifying in the object type 310 present in the traversal content 302 but not present in the stored content 306, the map information 322, or a combination thereof.

For further example, the discrepancy module 506 can determine the content discrepancy 320 in real-time during the user's travel. More specifically, as the traversal content 302 is captured by the capturing sensor 304, the navigation component 318 is identified in the traversal content 302 during the user's travel. The discrepancy module 506 can determine the content discrepancy 320 during the user's travel by presenting on the first device 102 of FIG. 1. The discrepancy module 506 can communicate the content discrepancy 320 to a filler module 510.

The navigation system 100 can include the filler module 510, which can couple to the discrepancy module 506. The filler module 510 generates the content filler 324 of FIG. 3. For example, the filler module 510 can generate the content filler 324 based on the content discrepancy 320.

The filler module 510 can generate the content filler 324 in a number of ways. For example, the filler module 510 can generate the content filler 324 based on the content discrepancy 320 between the traversal content 302 and the stored content 306. As discussed above, the traversal content 302 and the stored content 306 can have the content discrepancy 320 representing the object type 310.

For a specific example, the content discrepancy 320 can represent the road type 312 of a paved road. The filler module 510 can generate the content filler 324 for updating the map information 322 to be presented on the first device 102. More specifically, if the paved road is missing on the map information 322, the filler module 510 can generate the content filler 324 representing a digitized instance of the paved road to be included in the map information 322. The digitized instance of the object type 310, such as the paved road, can be stored in the first storage unit 414, the second storage unit 446, or a combination thereof. The filler module 510 can generate the content filler 324 by accessing the first storage unit 414, the second storage unit 446, or a combination thereof.

For further example, the filler module 510 can generate the content filler 324 based on the travel direction 216 of FIG. 2. More specifically, the user's vehicle can travel in the cardinal direction of north along the road type 312 of a paved road. The paved road can have a street name called Main Street. According to the map information 322, Main Street can be unavailable in the map information 322 used by the navigation system 100 from the current location 206 heading in the travel direction 216 representing north. Additionally, another instance of the road type 312 with the street name called State Street crossing the Main Street in the East West direction can also be unavailable on the map information 322.

The filler module 510 can generate the content filler 324 for the road type 312 based on the travel direction 216 where user is currently traveling. More specifically, the filler module 510 can generate the content filler 324 for the Main Street from the current location 206 heading in the travel direction 216 of north. However, the filler module 510 can avoid generating the content filler 324 for the road type 312 in the travel direction 216 where the user currently not traveling. The filler module 510 can communicate the content filler to a presentation module 512.

It has been discovered that the navigation system 100 generating the content filler 324 to fill the gap of the map information 322 improves the safety of the user. More specifically, by filling the map information 322 with the content filler 324, the navigation system 100 can improve the accuracy of the travel information 220 to the user. As a result, the navigation system 100 can improve the safety of the user operating the navigation system 100, the vehicle, the first device 102, or a combination thereof.

The navigation system 100 can include the vehicle module 508, which can couple to the analysis module 504. The vehicle module 508 calculates the vehicle count 222 of FIG. 2. For example, the vehicle module 508 can calculate the vehicle count 222 based on the traversal environment 202, the object type 310, or a combination thereof.

For a specific example, the vehicle module 508 can calculate the vehicle count 222 based on the vehicle type 316, the navigation component 318, or a combination thereof. As discussed above, the object image 308 identified as the vehicle type 316 can be captured by the capturing sensor 304 within the traversal environment 202. More specifically, a plurality of the object image 308 representing the vehicle type 316 can be captured from single instance of the traversal content 302. The vehicle module 508 can calculate the vehicle count 222 based on counting the object image 308 within the traversal content 302 identified as the vehicle type 316. The vehicle module 508 can communicate the vehicle count 222 to a traffic module 514.

The navigation system 100 can include the traffic module 514, which can couple to the vehicle module 508. The traffic module 514 determines the traffic condition 218 of FIG. 2. For example, the traffic module 514 can determine the traffic condition 218 based on the vehicle count 222 meeting or exceeding the count threshold 224.

More specifically, the traffic module 514 can determine the traffic condition 218 including a variety of instances of the traffic condition 218. For example, based on the vehicle count 222 meeting or exceeding the count threshold 224, the traffic module 514 can determine the traffic condition 218 of no traffic, light traffic, heavy traffic, or a combination thereof.

For a specific example, the traffic module 514 can determine the traffic condition 218 representing no traffic if the vehicle count 222 is below the count threshold 224. For another example, the traffic module 514 can determine the traffic condition 218 representing light traffic if the vehicle count 222 meets the count threshold 224. For further example, the traffic module 514 can determine the traffic condition 218 representing heavy traffic if the vehicle count 222 exceeds the count threshold 224. The traffic module 514 can communicate the traffic condition 218 to the presentation module 512.

The navigation system 100 can include the presentation module 512, which can couple to the filler module 510, the traffic module 514, or a combination thereof. The presentation module 512 presents the travel information 220. For example, the presentation module 512 can present the travel information 220 including the content filler 324, the traffic condition 218, or a combination thereof.

The presentation module 512 can present the travel information 220 in a number of ways. For example, the presentation module 512 can display the travel information 220 representing the digital map of the geographic area 204 where the user is currently traveling. Moreover, the presentation module 512 can display the travel information 220 including the content filler 324 representing the object type 310 missing from the map information 322.

More specifically, as discussed above, the map information 322 can be missing the object type 310 representing the road type 312 of the paved road. The presentation module 512 can initially display the map information 322 without the paved road as the travel information 220. After the capturing sensor 304 captured the traversal environment 202, the presentation module 512 can present the map information 322 updated by including the content filler 324 to supplement the missing instance of the road type 312. Furthermore, the presentation module 512 can update the travel route 210 of FIG. 2 to reach the destination 212 of FIG. 2 where the travel route 210 can include the content filler 324 representing the road type 312 to connect the disjointed, missing, or a combination thereof instance within the un-updated instance of the map information 322.

For a different example, the presentation module 512 can display the traffic condition 218 as part of the travel information 220. More specifically, the presentation module 512 can display the traffic condition 218 by displaying the vehicle count 222 surrounding the user's vehicle or the first device 102. Moreover, the presentation module 512 can display the traffic condition 218 of no traffic, light traffic, heavy traffic, or a combination thereof based on the comparison to the count threshold 224.

The physical transformation from traversing along the travel route 210 results in the movement in the physical world, such as people using the first device 102, the vehicle, or a combination thereof, based on the operation of the navigation system 100. As the movement in the physical world occurs, the movement itself creates additional information by the first device 102 capturing the traversal content 302 that is converted back into determining the content discrepancy 320, the content filler 324, the travel information 220, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the capture module 502, the analysis module 504, the discrepancy module 506, the filler module 510, the vehicle module 508, the traffic module 514, and the presentation module 512.

The first control unit 412 of FIG. 4 can execute the first software 426 for the capture module 502 to capture the traversal content 302. The first control unit 412 can execute the first software 426 for the analysis module 504 to determine the navigation component 318. The first control unit 412 can execute the first software 426 for the discrepancy module 506 to determine the content discrepancy 320.

The first control unit 412 can execute the first software 426 for the filler module 510 to determine the content filler 324. The first control unit 412 can execute the first software 426 for the vehicle module 508 to calculate the vehicle count 222. The first control unit 412 can execute the first software 426 for the traffic module 514 to determine the traffic condition 218. The first control unit 412 can execute the first software 426 for the presentation module 512 to present the travel information 220.

The second software 442 of FIG. 4 of the second device 106 of FIG. 4 can include the modules for the navigation system 100. For example, the second software 442 can include the capture module 502, the analysis module 504, the discrepancy module 506, the filler module 510, the vehicle module 508, the traffic module 514, and the presentation module 512.

The second control unit 434 of FIG. 4 can execute the second software 442 for the capture module 502 to capture the traversal content 302. The second control unit 434 can execute the second software 442 for the analysis module 504 to determine the navigation component 318. The second control unit 434 can execute the second software 442 for the discrepancy module 506 to determine the content discrepancy 320.

The second control unit 434 can execute the second software 442 for the filler module 510 to determine the content filler 324. The second control unit 434 can execute the second software 442 for the vehicle module 508 to calculate the vehicle count 222. The second control unit 434 can execute the second software 442 for the traffic module 514 to determine the traffic condition 218. The second control unit 434 can execute the second software 442 for the presentation module 512 to present the travel information 220.

The modules of the navigation system 100 can be partitioned between the first software 426 and the second software 442. The second software 442 can include the analysis module 504, the discrepancy module 506, the filler module 510, the vehicle module 508, and the traffic module 514. The second control unit 434 can execute modules partitioned on the second software 442 as previously described.

The first software 426 can include the capture module 502 and the presentation module 512. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the traversal content 302, the content filler 324, the travel information 220, or a combination thereof to or from the second device 106. The first control unit 412 can operate the first software 426 to operate the location unit 420 of FIG. 4. The second control unit 434 can operate the second communication interface 450 of FIG. 4 to communicate the traversal content 302, the content filler 324, the travel information 220, or a combination thereof to or from the first device 102 through the communication path 104 of FIG. 4.

The first control unit 412 can operate the first user interface 418 of FIG. 4, the second user interface 438 of FIG. 4, or a combination thereof to display the travel information 220, the travel route 210 of FIG. 2, the destination 212 of FIG. 2, the point of interest 214, the traffic condition 218 of the geographic area 204, the current location 206, or a combination thereof. More specifically, the first user interface 418, the second user interface 438, or a combination thereof can display the digital depiction of the travel route 210, the destination 212, the point of interest 214, the geographic area 204, the current location 206, or a combination thereof to represent the physical world.

The navigation system 100 describes the module functions or order as an example. The modules can be partitioned differently. For example, the vehicle module 508 and the traffic module 514 can be combined. Each of the modules can operate individually and independently of the other modules. Furthermore, data generated in one module can be used by another module without being directly coupled to each other. For example, the discrepancy module 506 can receive the traversal content 302 from the capture module 502. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
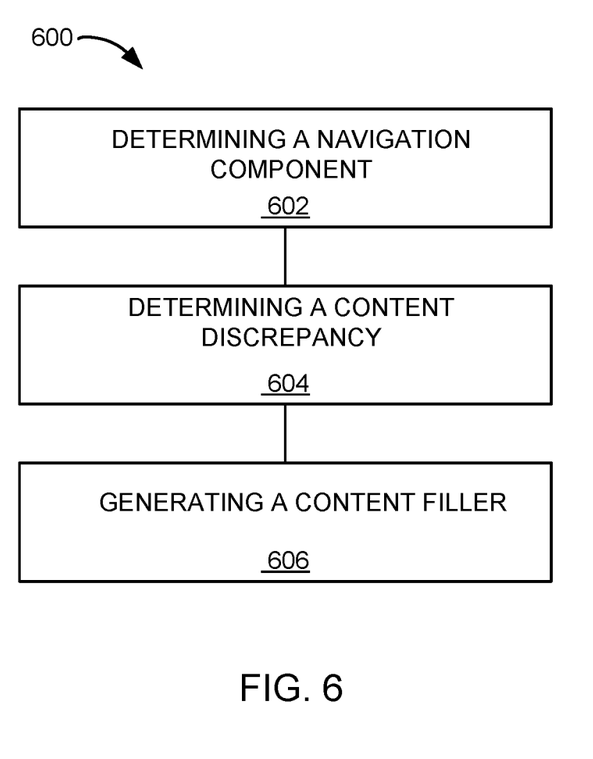
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a navigation component based on comparing a traversal content to a stored content for identifying an object type in a block 602; determining a content discrepancy based on the navigation component present in the traversal content but unidentified in the stored content in a block 604; and generating a content filler with a control unit based on the content discrepancy for presenting on a device the navigation component missing in map information in a block 606.

It has been discovered that the navigation system 100 determining the navigation component 318 of FIG. 3 based on comparing the traversal content 302 of FIG. 3 to the stored content 306 of FIG. 3 for identifying the object type 310 of FIG. 3 can improve the accuracy of delivering the travel information 220 of FIG. 2. By determining the content discrepancy 320 of FIG. 3 based on the navigation component 318 present in the traversal content 302 and not present in the stored content 306, the navigation system 100 can generate the content filler 324 to present the navigation component 318 missing in the map information 322 of FIG. 3. As a result, the navigation system 100 can improve the accuracy of presenting the travel information 220 for safer operation of the first device 102, the navigation system 100, the vehicle, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a navigation component based on comparing a traversal content to a stored content for identifying an object type;
   determining a content discrepancy based on the navigation component present in the traversal content but unidentified in the stored content;

generating a content filler with a control unit based on the content discrepancy for identifying the navigation component representing a road type different from the road type included in map information;
updating the map information by replacing the road type originally in the map information with the content filler representing a digitized instance of the road type for including in the map information to present on a device;
updating a travel route to include the content filler representing the road type for connecting a disjointed instance of a road within an un-updated instance of the map information to reach a destination; and
determining a traffic condition of the travel route based on a vehicle count meeting or exceeding a count threshold wherein the traffic condition representing no traffic when the vehicle count is below the count threshold, the traffic condition representing light traffic when the vehicle count meets the count threshold, and the traffic condition representing heavy traffic when the vehicle count exceeds the count threshold for presenting on the device.

2. The method as claimed in claim 1 wherein generating the content filler includes generating the content filler based on a travel direction for the road type currently traveled.

3. The method as claimed in claim 1 further comprising determining a traffic condition based on the vehicle count meeting or exceeding the count threshold representing a minimum number of vehicles.

4. The method as claimed in claim 1 further comprising validating the map information based on matching a point of interest on the map information to the point of interest identified on the traversal content.

5. The method as claimed in claim 1 further comprising determining a popularity level based on a people count meeting or exceeding the count threshold.

6. The method as claimed in claim 1 further comprising comparing the traversal content of a geographic location to the stored content of the same instance of the geographic location.

7. The method as claimed in claim 1 wherein determining the navigation component based on an object image to identify the navigation component present in the traversal content.

8. The method as claimed in claim 1 further comprising determining a user safety based on a vehicle type captured within the traversal content.

9. The method as claimed in claim 1 further comprising determining a current location based on a traffic controller type captured within the traversal content.

10. The method as claimed in claim 1 further comprising calculating a vehicle count based on a vehicle type identified within the traversal content.

11. A navigation system comprising:
a control unit for:
determining a navigation component based on comparing a traversal content to a stored content for identifying an object type,
determining a content discrepancy based on the navigation component present in the traversal content but unidentified in the stored content,
generating a content filler based on the content discrepancy for identifying the navigation component representing a road type different from the road type included in map information,
updating the map information by replacing the road type originally in the map information with the content filler representing a digitized instance of the road type for including in the map information,
updating a travel route to include the content filler representing the road type for connecting a disjointed instance of a road within an un-updated instance of the map information to reach a destination,
determining a traffic condition of the travel route based on a vehicle count meeting or exceeding a count threshold wherein the traffic condition representing no traffic when the vehicle count is below the count threshold, the traffic condition representing light traffic when the vehicle count meets the count threshold, and the traffic condition representing heavy traffic when the vehicle count exceeds the count threshold, and
a communication interface, coupled to the control unit, for communicating the map information, the travel information, the traffic condition, or a combination thereof for presenting on a device the navigation component missing in the map information.

12. The system as claimed in claim 11 wherein the control unit is for generating the content filler includes generating the content filler based on a travel direction for the road type currently traveled.

13. The system as claimed in claim 11 wherein the control unit is for determining a traffic condition based on the vehicle count meeting or exceeding the count threshold representing a minimum number of vehicles.

14. The system as claimed in claim 11 wherein the control unit is for validating the map information based on matching a point of interest on the map information to the point of interest identified on the traversal content.

15. The system as claimed in claim 11 wherein the control unit is for determining a popularity level based on a people count meeting or exceeding the count threshold.

16. A non-transitory computer readable medium including instructions for execution, the instructions comprising:
determining a navigation component based on comparing a traversal content to a stored content for identifying an object type;
determining a content discrepancy based on the navigation component present in the traversal content but unidentified in the stored content;
generating a content filler based on the content discrepancy for identifying the navigation component representing a road type different from the road type included in map information;
updating the map information by replacing the road type originally in the map information with the content filler representing a digitized instance of the road type for including in the map information to present on a device;
updating a travel route to include the content filler representing the road type for connecting a disjointed instance of a road within an un-updated instance of the map information to reach a destination; and
determining a traffic condition of the travel route based on a vehicle count meeting or exceeding a count threshold wherein the traffic condition representing no traffic when the vehicle count is below the count threshold, the traffic condition representing light traffic when the vehicle count meets the count threshold, and the traffic condition representing heavy traffic when the vehicle count exceeds the count threshold for presenting on the device.

17. The non-transitory computer readable medium as claimed in claim 16 wherein generating the content filler includes generating the content filler based on a travel direction for the road type currently traveled.

18. The non-transitory computer readable medium as claimed in claim 16 further comprising determining a traffic condition based on the vehicle count meeting or exceeding the count threshold representing a minimum number of vehicles.

19. The non-transitory computer readable medium as claimed in claim 16 further comprising validating the map information based on matching a point of interest on the map information to the point of interest identified on the traversal content.

20. The non-transitory computer readable medium as claimed in claim 16 further comprising determining a popularity level based on a people count meeting or exceeding the count threshold.

* * * * *